US009302772B2

(12) United States Patent
Boren et al.

(10) Patent No.: US 9,302,772 B2
(45) Date of Patent: *Apr. 5, 2016

(54) AIRCRAFT LAVATORY AND GALLEY SEPARATED BY AN INTERNAL WALL HAVING AN INTERMEDIATE NOTCH THAT IMPROVES THE LAVATORY ENVIRONMENT

(71) Applicant: The Boeing Company, Chicago, IL (US)

(72) Inventors: Kelly L. Boren, Marysville, WA (US); Mithra M.K.V. Sankrithi, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,582

(22) Filed: Jul. 2, 2014

(65) Prior Publication Data

US 2014/0353425 A1    Dec. 4, 2014

Related U.S. Application Data

(63) Continuation-in-part of application No. 13/645,972, filed on Oct. 5, 2012, now Pat. No. 8,770,517.

(51) Int. Cl.
B64D 11/00 (2006.01)
B64D 11/02 (2006.01)
B64D 11/04 (2006.01)

(52) U.S. Cl.
CPC ............... *B64D 11/02* (2013.01); *B64D 11/04* (2013.01)

(58) Field of Classification Search
None
See application file for complete search history.

(56) References Cited

U.S. PATENT DOCUMENTS

| 1,767,361 | A | * | 6/1930 | Hautot | B61D 1/08 105/315 |
| 4,645,145 | A | * | 2/1987 | Alie | B64D 11/02 105/314 |
| 4,884,767 | A | * | 12/1989 | Shibata | B64D 11/02 105/315 |
| 6,079,669 | A | * | 6/2000 | Hanay | B64D 11/02 244/118.5 |
| 6,604,709 | B1 | * | 8/2003 | Wentland | B64D 11/02 244/117 R |
| D486,565 | S | * | 2/2004 | Itakura | D23/274 |
| D487,137 | S | * | 2/2004 | Itakura | D23/274 |
| 6,938,284 | B2 | * | 9/2005 | Kitade | B64D 11/02 244/118.5 |
| 7,100,872 | B2 | * | 9/2006 | Quan | B64D 11/02 244/118.5 |
| 7,222,820 | B2 | * | 5/2007 | Wentland | B64D 11/02 244/118.5 |

(Continued)

FOREIGN PATENT DOCUMENTS

DE    102006023047    11/2007
EP    2148017    1/2010

(Continued)

OTHER PUBLICATIONS

European search report issued Nov. 11, 2015 in co-pending EP Patent Application No. 15175018.9-1754.

*Primary Examiner* — Medhat Badawi
(74) *Attorney, Agent, or Firm* — Joseph M. Rolnicki; Evans & Dixon, L.L.C.

(57) ABSTRACT

An internal wall in an aircraft cabin separates a lavatory and a galley of the aircraft. The internal wall has an intermediate notch that increases a lateral width dimension of the lavatory above the notch and thereby improves the spatial environment of the lavatory.

28 Claims, 11 Drawing Sheets

(56) References Cited

U.S. PATENT DOCUMENTS

| | | | | |
|---|---|---|---|---|
| 7,275,716 B2* | 10/2007 | Saint-Jalmes | ......... | B64D 11/00 244/118.6 |
| 7,284,287 B2* | 10/2007 | Cooper | ......... | B64D 11/02 4/664 |
| 7,354,018 B2* | 4/2008 | Saint-Jalmes | ......... | B64D 11/00 105/315 |
| 7,762,496 B2* | 7/2010 | Seiersen | ......... | B64D 11/00 105/316 |
| 7,823,831 B2* | 11/2010 | Guering | ......... | B64D 11/0601 105/316 |
| 7,866,603 B2* | 1/2011 | Cooper | ......... | B64D 11/02 244/117 R |
| 8,519,824 B1* | 8/2013 | Rankin | ......... | B64D 11/00 244/118.5 |
| 2005/0103935 A1* | 5/2005 | Sprenger | ......... | B64D 11/00 244/118.6 |
| 2005/0116099 A1* | 6/2005 | Pho et al. | ......... | B64D 11/02 244/118.5 |
| 2012/0221192 A1* | 8/2012 | Seibt | ......... | B64D 11/02 701/29.1 |
| 2013/0099055 A1* | 4/2013 | Pfeiffer | ......... | B64D 11/02 244/118.5 |
| 2013/0206904 A1* | 8/2013 | Gee | ......... | B64D 11/02 244/118.5 |
| 2013/0206905 A1* | 8/2013 | Savian | ......... | B64D 11/003 244/118.5 |
| 2014/0097294 A1* | 4/2014 | Boren | ......... | B64D 11/04 244/118.5 |
| 2014/0117156 A1* | 5/2014 | Boren | ......... | B64D 11/02 244/118.6 |

FOREIGN PATENT DOCUMENTS

| | | |
|---|---|---|
| EP | 2716545 | 9/2014 |
| FR | 2941917 | 8/2010 |
| JP | 2008239036 | 10/2008 |
| WO | WO2004/076279 | 9/2004 |
| WO | WO2014057667 | 4/2014 |

* cited by examiner

AIRCRAFT LAVATORY AND GALLEY SEPARATED BY AN INTERNAL WALL HAVING AN INTERMEDIATE NOTCH THAT IMPROVES THE LAVATORY ENVIRONMENT

This patent application is a Continuation-In-Part of patent application Ser. No. 13/645,972, which was filed on Oct. 5, 2012 and issued as U.S. Pat. No. 8,770,517 on Jul. 8, 2014.

FIELD

The present disclosure pertains to the configuration of an internal wall in an aircraft cabin that separates a lavatory and a galley of the aircraft. In particular, the present disclosure pertains to an aircraft cabin having a lavatory and galley separated by an internal wall, where the internal wall has an intermediate notch that increases a lateral width dimension of the lavatory above the notch and thereby improves the environment and enhances the functionality and ergonomics of the lavatory.

BACKGROUND

Commercial aircraft set up for the transportation of passengers typically include rows of seats along the length of the aircraft cabin that are separated by a central aisle, at least one galley in the cabin, and one or more lavatories in the cabin. Because the primary purpose of a commercial aircraft is to transport passengers, the aircraft cabin is usually set up to maximize the number of seats in the cabin. As a result, it is challenging to provide adequate lavatory space without reducing seat count.

A typical passenger aircraft includes at least one lavatory enclosure that is positioned along the central aisle of the aircraft among the rows of seats. The lavatory enclosure is accessed through a doorway from the central aisle. The width of the lavatory enclosure is typically not much larger than the width of the doorway. The dimensions of the lavatory enclosure often make it difficult for a user to move around in the enclosure, much less provide comfortable elbow room in the enclosure. Thus, passengers who are above median height and weight and are using conventional aircraft lavatories may feel uncomfortably confined in the lavatory enclosure.

SUMMARY

The aircraft lavatory enclosure of the present disclosure overcomes the disadvantages associated with prior art aircraft lavatory enclosures discussed above. This is accomplished by repositioning the lavatory enclosure in the aircraft cabin away from the rows of the seats and the central aisle. The lavatory enclosure of the disclosure is moved to a position adjacent a cross-aisle at the rear of the aircraft cabin that provides access to two aircraft cabin doors on laterally opposite sides of the aircraft. Moving the aircraft lavatory to a position rearwardly of the cross-aisle enables the lavatory enclosure to be reconfigured to make the best use of available space at the rear of the aircraft cabin.

In the aircraft of the disclosure, a pair of lavatory enclosures are positioned adjacent laterally opposite sides of the aircraft body. Each of the lavatories is positioned in areas on opposite sides of a galley located at the rear of the aircraft cabin. The first lavatory of the pair is positioned between one side of the galley and a first interior sidewall of the aircraft body and the second lavatory of the pair is positioned between the opposite side of the galley and a second interior sidewall of the aircraft body. In one preferred embodiment, the first and second lavatories are basically mirror images of each other. However, it is not necessary that the first and second lavatories always be the same, and the first and second lavatories could have different constructions with different features and floor plans. Therefore, only the first lavatory enclosure will be described in detail, with it being understood that the second lavatory enclosure could be a mirror image thereof.

The first lavatory enclosure includes a front wall with a doorway that is accessible from the cross aisle of the cabin. The front wall extends laterally from the first interior sidewall of the aircraft body to the galley in the rear of the aircraft cabin. An internal wall in the cabin separates the lavatory from the galley. The internal wall extends longitudinally from the lavatory front wall to a rear bulkhead wall of the aircraft cabin. The internal wall is comprised of a lower section, an intermediate section and an upper section that are all interconnected. The wall lower section extends vertically upwardly from the floor surface between the adjacent lavatory and the galley. The lower section extends upwardly to a vertical height above the toilet in the adjacent lavatory where the lower section connects with the intermediate section. The wall intermediate section extends from the lower section laterally towards the centerline of the airplane and over a lower portion of the galley. The wall upper section then extends vertically upwardly from the intermediate section to the roof of the cabin. The intermediate section of the wall moves the upper section of the wall laterally away from the center of the toilet. This creates a notch in the lavatory that increases the lateral width of the lavatory above the wall intermediate section. The increase in the lavatory width provides more usable space in the lavatory for passengers using the lavatory, while still retaining the small footprint of the lavatory on the floor surface of the aircraft between the wall lower section and the adjacent interior sidewall of the aircraft. The increased usable space gives the lavatory an impression of additional spaciousness and a more comfortable atmosphere. Additionally, the repositioned lavatory has made more space available along the central aisle of the aircraft to add passenger seating and improve the economic efficiency of the aircraft.

In addition to the increased usable space in the lavatory provided by the notch formed in the internal wall, further modifications have been made to the lavatory to give the impression of spaciousness. Each of the modifications may be applied to one lavatory, or the modifications may be used in various different combinations in different lavatories.

The lavatory floor inside the lavatory has been ramped downward. The lavatory floor surface has a front edge at the floor surface of the aircraft cabin and a longitudinally opposite rear edge. As the lavatory floor surface extends from the front edge to the rear edge, the floor surface declines vertically downward from horizontal. This gives the lavatory an inch or more of additional standing height at the rear of the lavatory.

The lavatory internal wall upper section has been curved or angled to increase the elbow room in the lavatory. The internal wall upper section has opposite left and right side edges and an intermediate portion of the internal wall between the edges. The intermediate portion of the internal wall upper section extends away from the lavatory as the internal wall upper section extends from the opposite left and right edges toward the intermediate portion.

An outboard window with a window shade has been added to the lavatory. The window could be an actual window with a view outside the aircraft, or a faux window. The open window improves the feeling of spaciousness in the lavatory.

A collapsible shelf has been added to the lavatory internal wall. The collapsible or folding shelf is moveable between the horizontal position where the shelf can support toiletry items, and a vertical position of the folding shelf where the shelf does not extend into the space of the lavatory.

The internal wall intermediate section has been lowered from its position above the stowage space or galley cart space to a position in line with the toilet seat of the lavatory. This provides additional hip room in the lavatory and enables the toilet to be moved inboard slightly away from the outboard interior side wall, further enhancing the spaciousness of the lavatory.

To assist larger passengers, a grab handle has been added to the internal wall of the lavatory. The enhanced spaciousness provided by the construction of the internal wall enables the addition of the grab handle. The grab handle will be useful to passengers using the lavatory during a rough flight and for larger passengers using the lavatory.

In addition to the addition of a grab handle in the lavatory to assist larger passengers, the internal wall of one of the lavatories is moved further inboard than the internal wall of the second of the lavatories. This creates a wider lavatory in which the toilet also can be moved further inboard. This wider lavatory with the toilet moved slightly inboard is provided to accommodate obese passengers.

In a further embodiment of the pair of lavatory enclosures the pair of lavatories are able to be communicated with each other to enable communication between family members using both lavatories. A counter surface is provided above the stowage area. The counter surface is continuous with the first internal wall intermediate section of the first lavatory and the second internal wall intermediate section of the second lavatory. A vertical partition is attached to the first internal wall upper section adjacent the front edge of the counter surface. The partition is moveable between an open position and a closed position. In the closed position the partition extends laterally over the counter surface adjacent the counter surface front edge between the first internal wall upper section and the second internal wall upper section. In the open position the partition is displaced from over the counter surface and is folded up next to the first internal wall upper section.

Both the first internal wall upper section and the second internal wall upper section are moveable between open positions and closed positions. In the closed positions of the upper sections the upper sections extend between the internal wall intermediate sections and the counter surface, separating the first and second lavatories from the counter surface. In the open positions the first internal wall upper section and the second internal wall upper section are pivoted outwardly over the counter surface, providing access to the counter surface from both lavatories and communication between the two lavatories behind the closed partition.

In a variant of the lavatory embodiment with the partition and moveable internal wall upper section, a stationary vertical wall is positioned in the middle of the counter surface and the partition only opens to the stationary vertical wall. The internal wall upper section can be pivoted open over the counter surface behind the closed partition, providing a counter surface in the lavatory that could be used as a changing table or for other purposes.

In still a further embodiment of the pair of lavatories separated by a galley or stowage space, the counter surface provided over the stowage space is moveable rearwardly. This enables service carts to be positioned under the counter surface with one service cart in front of a second service cart. Moving the counter surface forward would cover the inline service carts, and pushing the counter surface backward or pivoting the counter surface backward would provide access to the second service cart behind the first service cart.

In still a further embodiment of the counter surface between the two lavatories, a waste bin is provided beneath the counter surface. An access opening is provided in the counter surface providing access to the waste bin. A further access opening is provided in the lavatory internal wall with the further access opening providing access to the same waste bin.

In each embodiment of the lavatories with the counter surface between the lavatories, indirect lighting is provided above the internal wall upper section. The indirect lighting positioned above the internal wall upper section provides light to both the lavatory and the counter surface.

The features, functions and advantages that have been discussed can be achieved independently in various embodiments or may be combined in yet other embodiments further details of which can be seen with reference to the following description and drawings.

BRIEF DESCRIPTION OF THE DRAWINGS

Further features of the aircraft lavatory of the disclosure are set forth in the following detailed description of the aircraft and in the drawing figures.

DESCRIPTION

Figure 1:
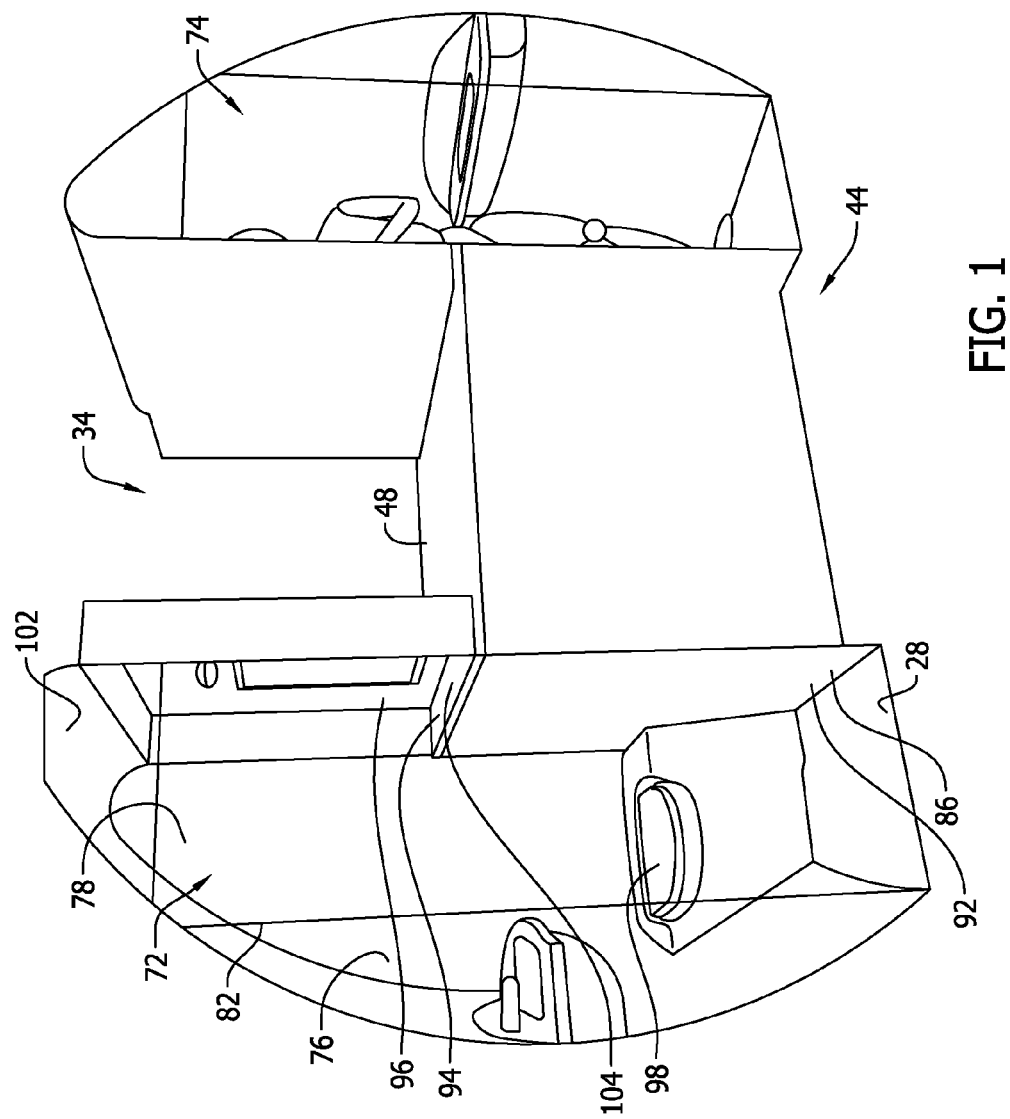
FIG. 1 is a representation of a front perspective view of the aircraft lavatory.

FIG. 1 is a representation of the floor plan at the rear of a typical aircraft cabin where lavatories of the aircraft are located. In FIG. 1 a rearward portion of the aircraft fuselage or body 12 that surrounds the aircraft cabin is shown in cross section. As is conventional, the aircraft cabin has a longitudinal length between a front 14 of the cabin and a rear 16 of the cabin. The cabin also has a lateral width between opposite first 18 and second 22 interior sidewalls of the aircraft body.

A plurality of rows of seats 24, 26 may be arranged on the floor surface 28 of the aircraft cabin. The rows of seats 24, 26 may also be arranged on laterally opposite sides of the cabin and define a central aisle 32. The central aisle 32 may also extend longitudinally through the cabin across the floor surface 28 between the front 14 and rear 16 of the cabin and between the rows of seats 24, 26. A galley 34 may be provided in the rear of the cabin at the rearward end of the central aisle 32. This space could be used for other purposes and could be broadly described as a stowage space 34.

A cross aisle 36 may extend laterally across the rear 16 of the cabin in front of the galley 34. The cross aisle 36 may extend between a pair of boarding doors 38, 42 in the respective sidewalls 18, 22 of the aircraft body.

The galley 34 may typically include a galley cart compartment 44 containing a plurality of galley carts 46. In the example shown in FIG. 1 the galley cart compartment 44 contains four galley carts 46. Each galley cart 46 is supported by rollers on the floor surface 28 and is inserted longitudinally into a slot provided for the cart in the compartment 44. The galley also includes a countertop 48 on top of the compartment 44. Although not shown, the galley 34 also may include appliances such as a coffee maker, a hotplate, a microwave oven, etc. above the counter 48.

Galley equipment is produced according to basically two worldwide standards, namely ATLAS and KSSU. These have their origins in the industry in legacy maintenance resource pools (ATLAS=Alitalia, TAP, Lufthansa, Air France, Sabena and KSSU=KLM, Swissair, SAS, UTA) and have subsequently developed into industry standards to enable modular equipment interchange between aircraft of different manufacturers.

Each piece of ATLAS standard equipment is preferably able to fit in any ATLAS galley on any aircraft type of any airline worldwide. The same is true for the KSSU standard equipment. ATLAS equipment is today's leader for worldwide market share with about 75% of galley equipment manufactured being either ATLAS standard or ATLAS compatible. KSSU has about a 20% market share and a handful of legacy air lines with proprietary standards (BA has a proprietary standard called "ACE" for example) account for the remaining 5%.

Equipment standards for ATLAS and KSSU include specifications for most anything ranging from carts to oven racks to coffeepots to plastic cups to storage boxes. A variation of even a single millimeter from the standard specifications for galley equipment could result in equipment not being able to stow securely and the consequent safety issues that result.

Most equipment is actually manufactured by the same companies. For example, rotatable or movable equipment (carts, etc.) are manufactured by companies such as Driessen and Diethelm-Keller. Consumables such as trays, cups, etc. are manufactured by companies such as DeSter and Helios. These companies either provide airlines with branded or generic versions of existing designs or developed entirely new product lines within the existing standards.

Figure 3:
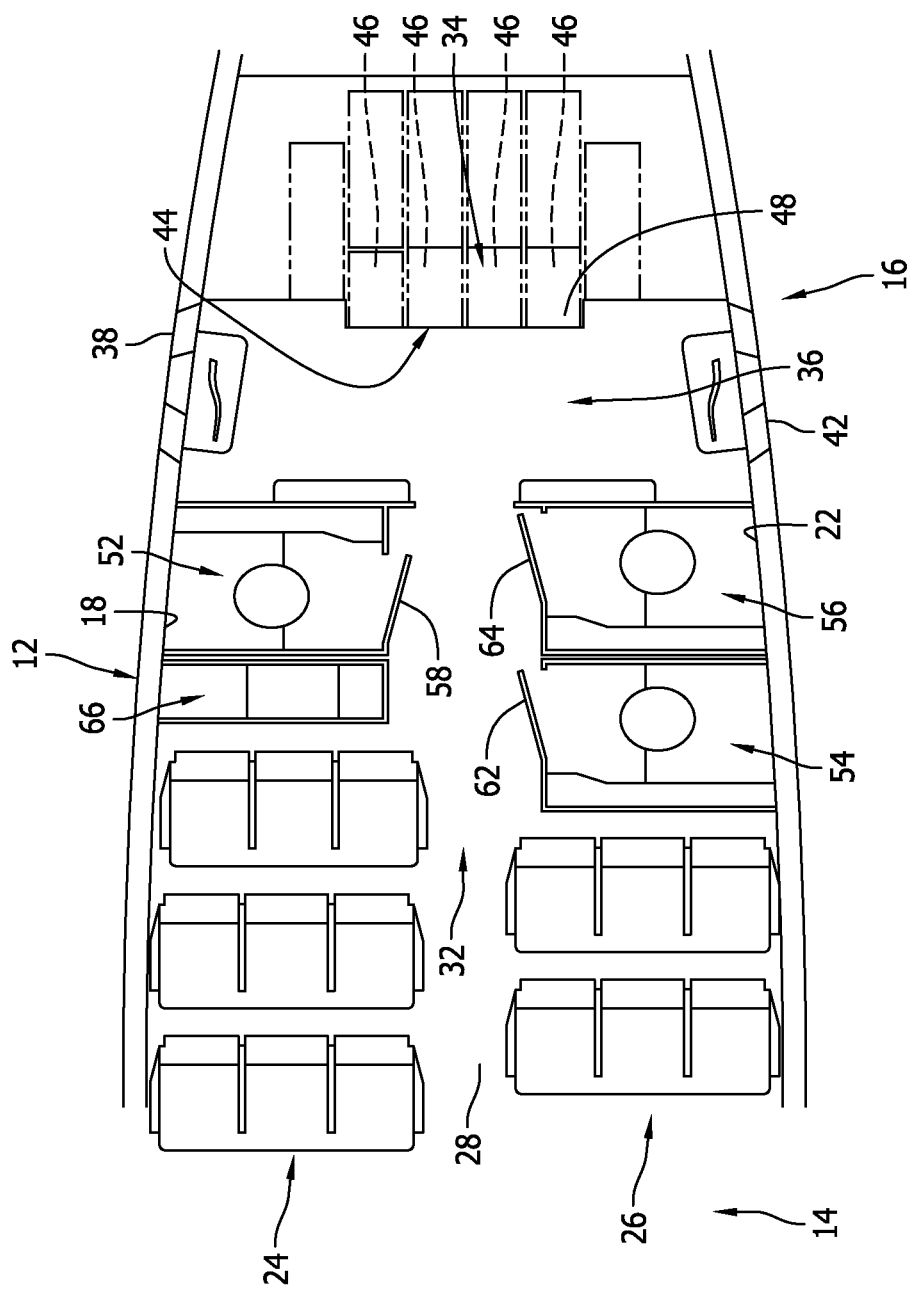
FIG. 3 is a representation of a portion of a conventional aircraft floor plan at the rear of the aircraft cabin showing the typical locations of lavatories of the aircraft relative to the passenger seating and the galley of the aircraft.

In the example shown in FIG. 3, the aircraft includes three lavatory enclosures 52, 54, 56. Each of the enclosures is accessible through a respective door 58, 62, 64 of the enclosures 52, 54, 56. A small coat closet 66 is also provided in the cabin. As can be seen in FIG. 1, the width dimension of each of the lavatory enclosures 52, 54, 56 set in order to maximize the passenger seating in the aircraft cabin. The width of each lavatory enclosure 52, 54, 56 is not much larger than the width of its respective door 62, 64, 66. The dimensions of the lavatory enclosures 52, 54, 56 often make it difficult for a user to enter the enclosure from the central aisle 32 and move around in the enclosure, much less provide comfortable elbow room in the enclosure. The narrow width of the enclosures 52, 54, 56 may result in passengers using the lavatories feeling uncomfortably confined in the enclosures.

The aircraft lavatory enclosure of the present disclosure overcomes the disadvantages associated with prior art aircraft lavatory enclosures discussed above. This is accomplished by repositioning the lavatory enclosure in the aircraft cabin away from the rows of the seats and the central aisle. The enclosure is moved to a position rearwardly of the cross-aisle 36 at the rear of the aircraft cabin. Moving the aircraft lavatory to a position rearwardly of the cross-aisle 36 enables the lavatory enclosure to be reconfigured to make the best use of available space at the rear of the aircraft cabin.

Figure 2:
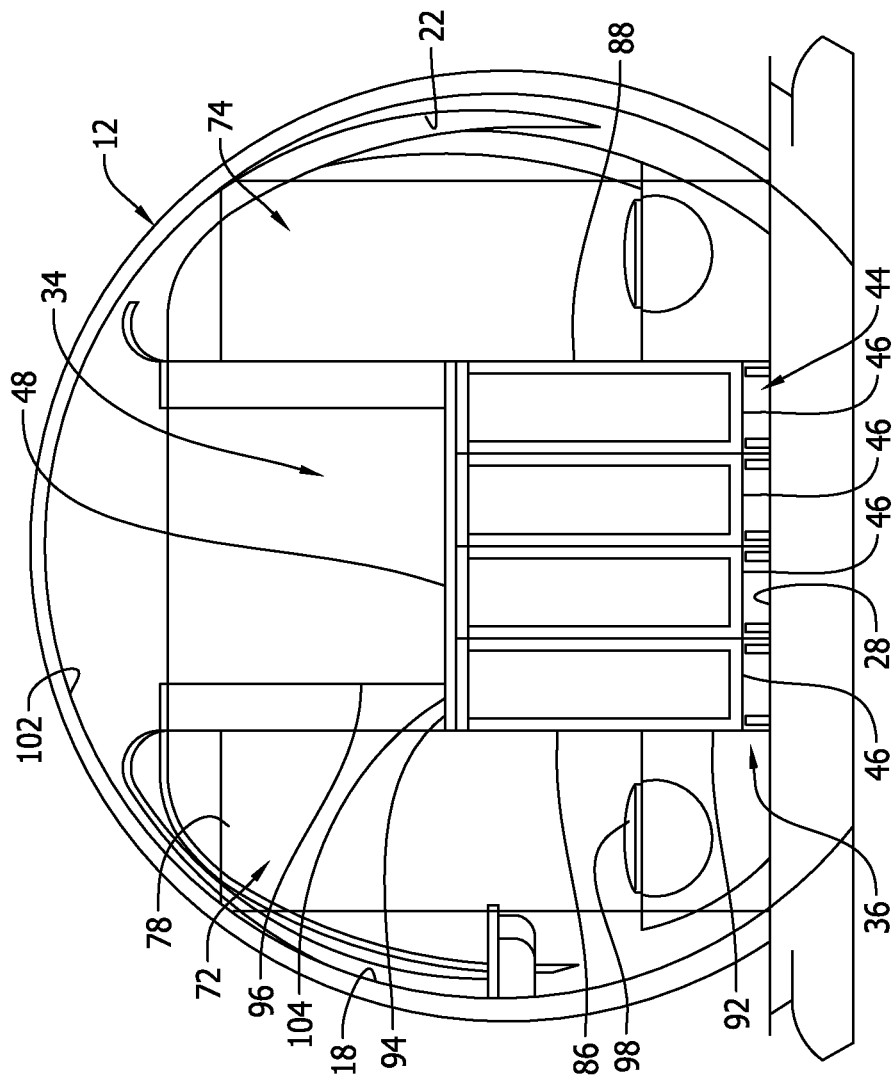
FIG. 2 is a representation of a front view of the lavatory of the disclosure at the rear of the aircraft cabin.
Figure 4:
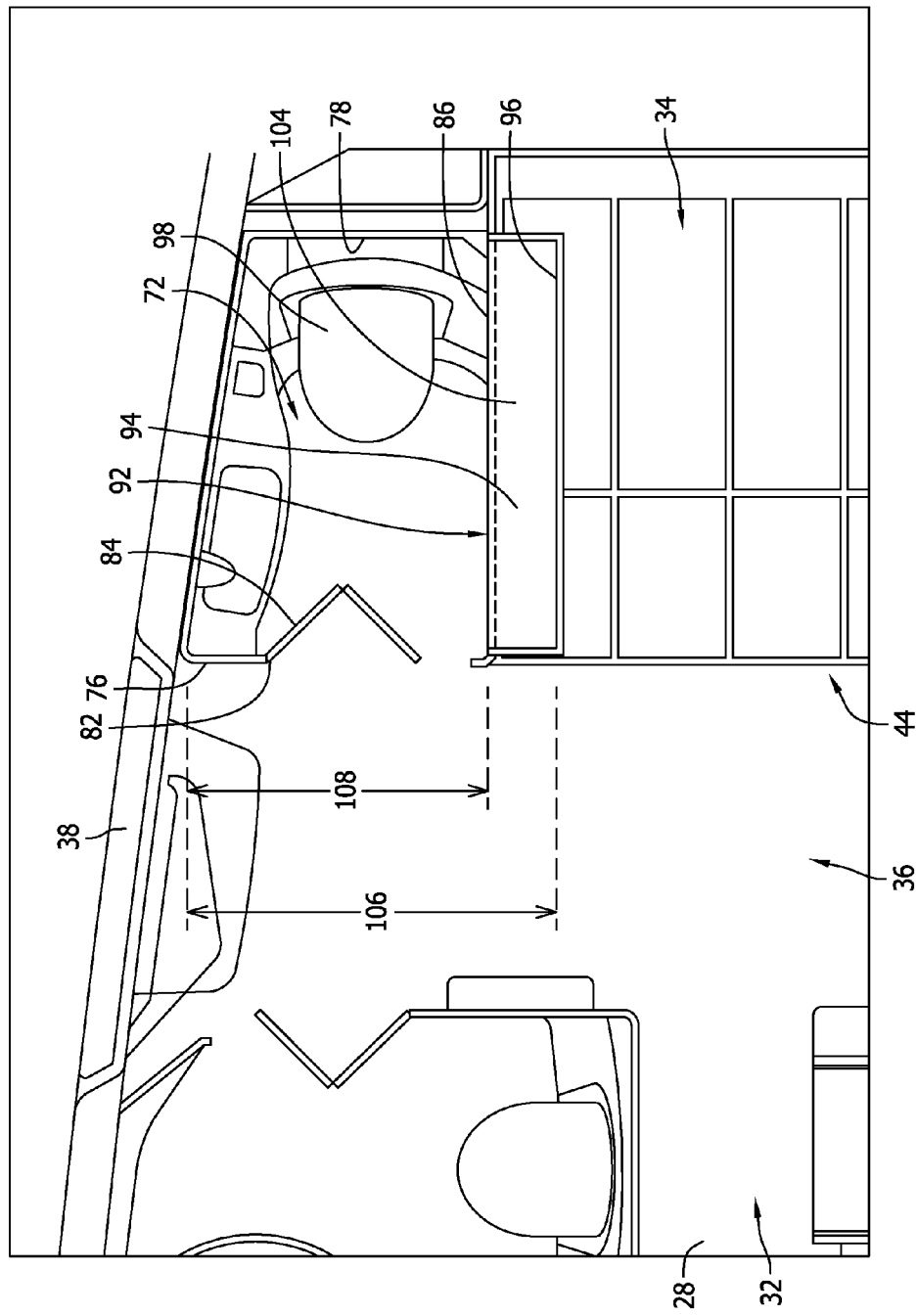
FIG. 4 is a representation of the floor plan at the rear of the aircraft of the disclosure with the relocated lavatory of the disclosure.

FIG. 2 is a front elevation view of a pair of lavatories 72, 74 of an embodiment of the present disclosure that have been installed at the rear of the aircraft cabin shown in FIG. 1. The lavatories 72, 74 are positioned rearwardly of the cross-aisle 36 and on laterally opposite sides of the galley 34. In comparing FIGS. 1 and 2, it can be seen that the lavatories 72, 74 have been positioned in areas available between the galley 34 and the opposite first 18 and second 22 interior sidewalls of the aircraft body. FIG. 1 is a perspective review of a pair of lavatories of the disclosure, and FIG. 4 is a plan view of one of the lavatories of the disclosure. In the embodiments shown in FIGS. 1 and 2 the pair of lavatories may include a first 72 and second 74 lavatory that are mirror images of each other. However, it is not necessary that the first 72 and second 74 lavatories be the same, and the lavatories could have different constructions with different features and floor plans. Only the first lavatory 72 will be described in detail.

Referring to FIG. 2, the lavatory 72 may include a front wall 76 as part of its enclosure. The aircraft body first internal sidewall 18 and a rear bulkhead wall 78 of the aircraft may also form portions of the enclosure of the lavatory. The front wall 76 may have a doorway 82 that is accessible from the cross-aisle 36. A door 84 is secured to the front wall 76 and can be manually operated to selectively open and close the doorway 82 in a conventional manner. The door 84 selected for the lavatory 72 may be a double fold door that basically folds into the area of the lavatory 72 when opening the door. This prevents the door 84 from obstructing movement through the cross aisle 36 at the rear of the cabin.

In addition, the enclosure of the lavatory 72 includes an internal wall 86. The internal wall 86 may be positioned laterally between the galley 34 and the lavatory 72. In a further embodiment an aircraft may contain two lavatories 72, 74 in the aircraft cabin. They may be arranged such that, a pair of internal walls 86, 88 in the cabin separate each of the respective lavatories 72, 74 from the galley 34 at the center of the cabin.

The first internal wall 86 is comprised of a lower section 92, an intermediate section 94 and an upper section 96. Each of the sections may be interconnected as seen in the drawing figures. Additionally, each of the wall sections extend longitudinally through the cabin from the lavatory enclosure front wall 76 to the rear bulkhead wall 78, thereby completing the lavatory enclosure.

The wall lower section 92 may extend vertically upwardly from the floor surface 28 between a lower area of the adjacent lavatory 72 and a lower area of the galley 34. The lower section 92 may be perpendicular to the floor surface 28 and extends upwardly from the floor surface to the wall intermediate section 94. The height of the lower section 92 may position the intermediate section 94 at a position vertically above the toilet 98 in the lavatory 72. Additionally, the height of the lower section 92 may position the intermediate section 94 vertically above the galley cart compartment 44.

The intermediate section 94 extends horizontally from the lower section 92 over the lower area of the galley and the galley cart compartment 44 and inboard or toward the centerline of the airplane from the lavatory 72. The intermediate section 94 extends from the lower section 92 to the wall upper section 96. As shown in FIGS. 2 and 3, the wall intermediate section 94 may be coplanar with the galley counter top 48. In an alternative embodiment, the intermediate section 94 may be continuous with the galley counter top 48. In a further embodiment a single structure may form the wall intermediate section 94 and the galley counter top 48. The intermediate section also adds a countertop 104 to the lavatory 72. Depending on the type of equipment employed in the galley, for example whether ATLAS or KSSU equipment is used, and what quantities of equipment, for example whether four carts or three carts are used, the intermediate section 94 could have a lateral width dimension ranging from 2 inches to 20 inches. In other environments, the intermediate section 94 could have other lateral width dimensions and other orientations than the horizontal orientation shown.

The wall upper section 96 may extend vertically upwardly from the intermediate section 94 between an upper area of the lavatory and an upper area of the galley to the roof 102 of the aircraft cabin. The intermediate section 94 positions the upper section 96 laterally further inboard from the first interior sidewall 18 of the aircraft body from the lower section 92. Thus as shown in FIG. 4, the lateral width dimension 106 of the lavatory 72 above of the intermediate section 94 is larger than the largest lateral width dimension 108 of the lavatory 72 below the intermediate section 94. Furthermore, the intermediate section 94 and the upper section 96 together form a notch in the lavatory 72 that provides additional area to the lavatory. The increase in the lavatory width above the intermediate section 94 provides more usable space in the lavatory for passengers using the lavatory, while still retaining the small footprint of the lavatory on the floor surface 28 between the lower section 92 and the first interior sidewall 18. The increased usable space gives a lavatory an impression of spaciousness and a more comfortable atmosphere.

With the modification of the rear of the aircraft cabin shown in FIG. 1 by the repositioned lavatories of the disclosure, the lavatory enclosures 52, 54, 56 shown at the rear of the aircraft cabin 16 in FIG. 3 can be removed, enabling the addition of more passenger seating to the aircraft and thereby improving the economic efficiency of the aircraft.

As stated earlier, in addition to the increased usable space in the lavatory provided by the notch formed in the internal wall, further modifications are made to the lavatory to give the impression of spaciousness. The features of the modifications to be described may or may not be included in one lavatory. The features can be used in various combinations in various different lavatories.

Figure 5:
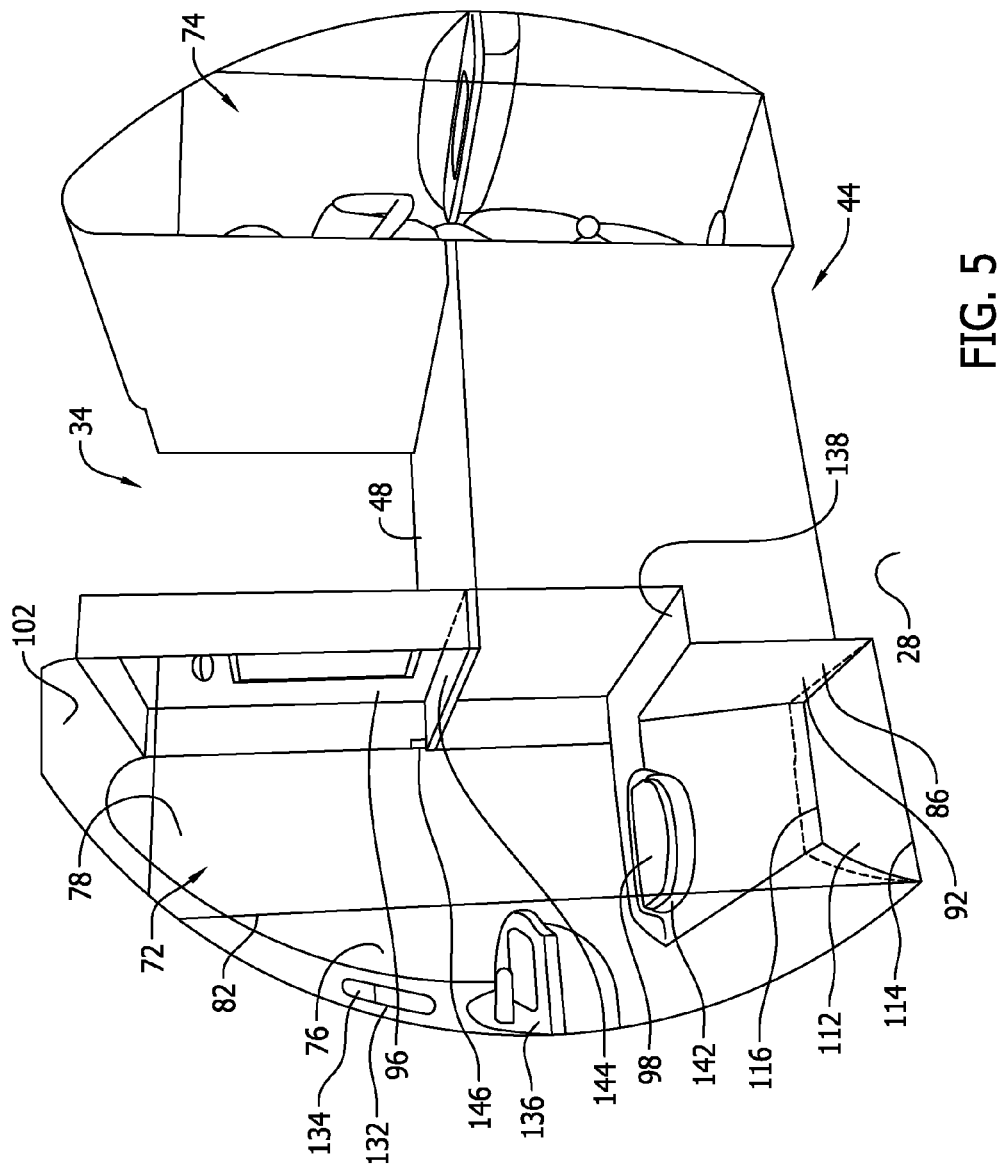
FIGS. 5-11 are representations of further embodiments of the aircraft lavatories having modifications made to the lavatories to give the impression of spaciousness.

Referring to FIG. 5, the lavatory floor surface 112 inside the lavatory has been ramped downward. The lavatory floor surface 112 has a front edge 114 at the floor surface 28 of the aircraft cabin and a longitudinally opposite rear edge 116. As the lavatory floor surface 112 extends from the front edge 114 to the rear edge 116, the lavatory floor surface 112 declines vertically downward from the horizontal plane represented in dashed lines in FIG. 5 of the aircraft cabin floor surface 28.

Figure 6:
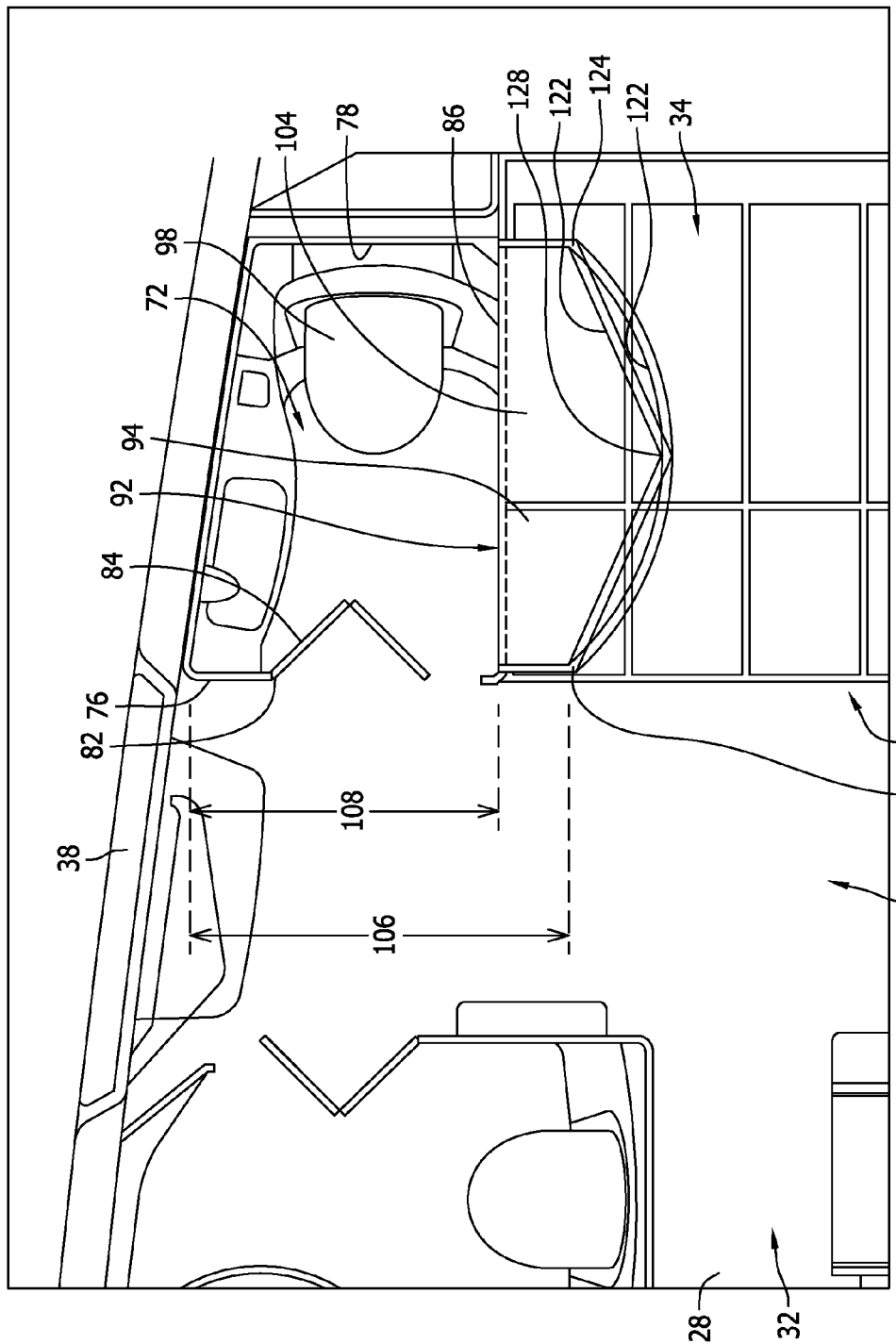

Referring to FIG. 6, the lavatory inner wall upper section 122 is curved or angled outwardly from the lavatory to increase the elbow room in the lavatory. The inner wall upper section 122 has opposite left 124 and right 126 side edges and an intermediate portion 128 of the internal wall upper section between the edges. The intermediate portion 128 of the internal wall upper section 122 extends away from the lavatory as the internal wall upper section 122 extends from the opposite left 124 and right 126 edges toward the intermediate portion 128.

Referring to FIG. 5, an outboard window 132 with a window shade 134 is provided for the lavatory just above the sink 136. The window 132 could be an actual window with a view outside the aircraft, or a faux window that provides translucent light without direct viewing. A user of the lavatory can open the window shade 134 to improve the feeling of spaciousness in the lavatory.

Referring to FIG. 5, the internal wall intermediate section 138 has been lowered from its position above the stowage space or galley cart space to a position in line with the toilet seat 142 of the lavatory. This provides additional hip and elbow room in the lavatory.

Also represented in FIG. 5 is a collapsible or folding shelf 144 that has been added to the lavatory internal wall. The folding shelf 144 is attached to the internal wall by a hinge or other equivalent mechanism for pivoting movement between its horizontal position shown in FIG. 5 and a vertical position where the hinge mechanism suspends the shelf 144 vertically downward from the internal wall. In the vertical position the shelf 144 does not extend into the space of the lavatory. One or more releasable latches 146 could be provided on the shelf 144 to hold the shelf in its horizontal position. In the horizontal position of the shelf 144, the shelf could be used to support toiletry items or other types of items used by the occupant of the lavatory.

Figure 7:
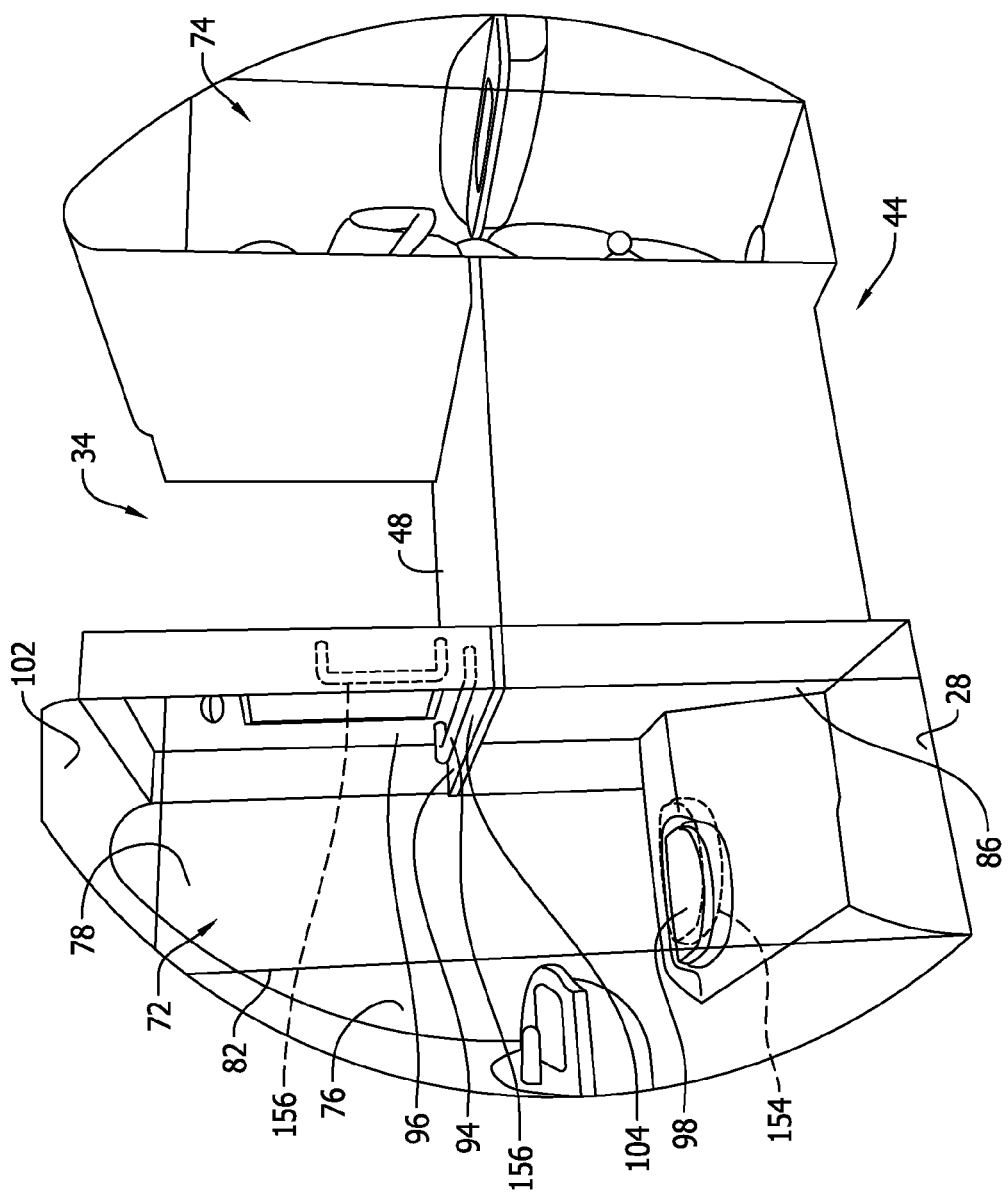

FIG. 7 shows a representation of the lavatory in which the internal wall lower section 152 has been moved inboard to the same plane as the internal wall upper section 96. This creates a wider lavatory in which the toilet can be moved further inboard as represented by the dashed lines 154 in FIG. 7. This wider lavatory with the toilet moved slightly inboard is provided to accommodate obese passengers. It also provides the aircraft with the option of using a lavatory of a conventional width such as the second lavatory 74, or using a lavatory with a larger width.

To assist larger passengers, a grab handle 156 is added to the internal wall of the lavatory represented in FIG. 7. As represented in FIG. 7, the grab handle(s) 156 could be oriented horizontally or vertically or both. The grab handle 156 will be useful to passengers using the lavatory during a rough flight or for larger passengers using the lavatory.

Figure 8:
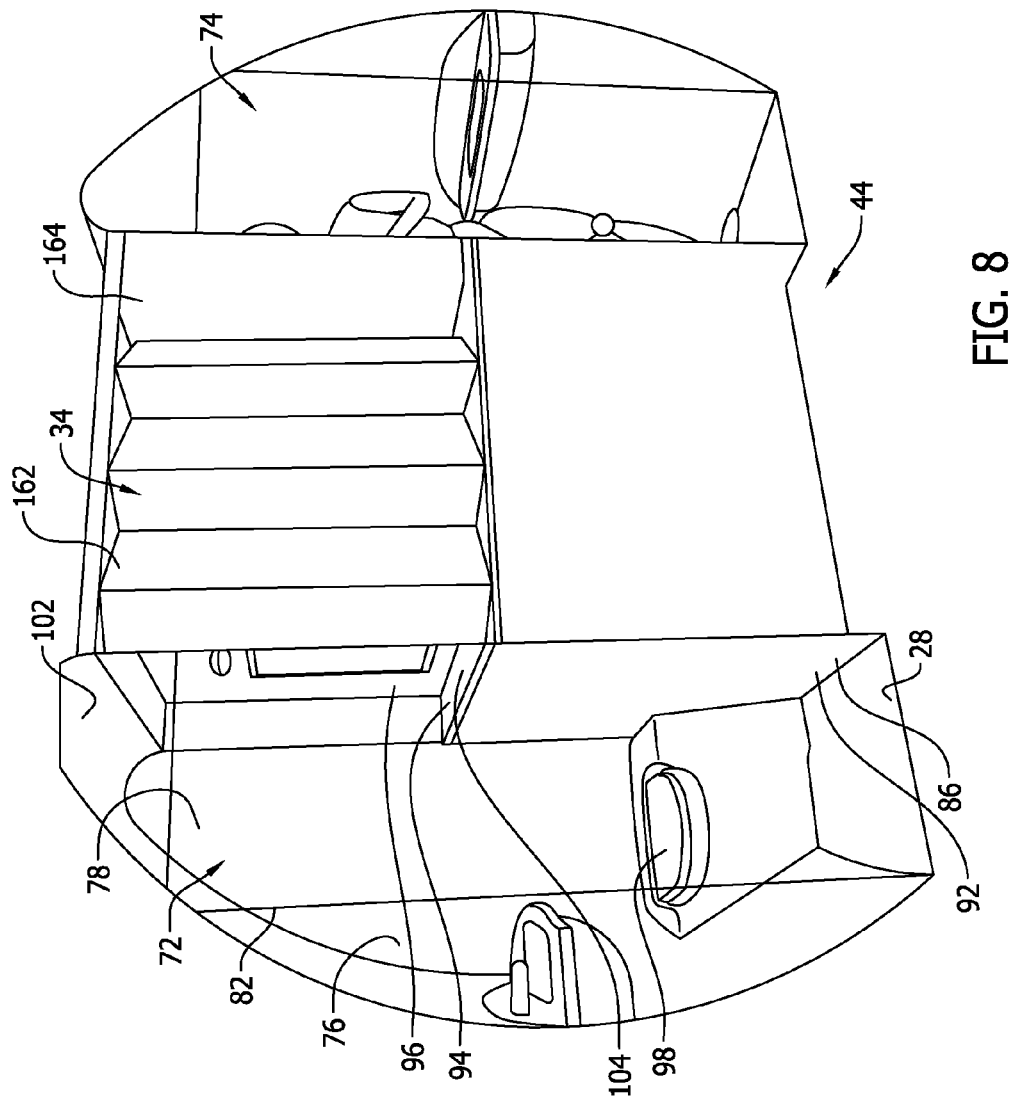

FIG. 8 is a representation of a further embodiment of the pair of lavatory enclosures 72, 74 in which the pair of lavatories are able to be communicated with each other to enable communication between family members using both lavatories. As in the previous embodiments, the counter surface 48 is positioned above the stowage area or galley cart compartment 44. The counter surface 48 is continuous with the first internal wall intermediate section 94 of the first lavatory 72 and the second internal wall intermediate section (not shown) of the second lavatory 74. A foldable vertical partition 162 is attached to the first internal wall upper section 96 along a right side of the first internal wall upper section 96. The partition 162 is positioned above a front edge of the counter surface 48. As represented in FIG. 8, the partition 162 is moveable between an open position and a closed position. In the closed position the partition 162 extends laterally, left to right as viewed in FIG. 8 over the counter surface 48 adjacent the counter surface front edge. The closed partition extends from the first internal wall upper section 96 to the second internal wall upper section 164. In the closed position the partition 162 can be locked by a family member in the second lavatory 74. In the open position the partition 162 is moved to the left as represented in FIG. 8 and is displaced from over the counter surface 48. The open partition 162 is folded up next to the first internal wall upper section 96.

The first internal wall upper section 96 and the second internal wall upper section 164 are connected by pivoting devices to the rear bulkhead wall 78. This enables both the first internal wall upper section 96 and the second internal wall upper section 164 to be pivoted between open and closed positions. In the closed positions the first internal wall upper section 96 and the second internal wall upper section 164 both extend across their respective intermediate sections between the intermediate sections and the counter surface 48. The first internal wall upper section 96 and the second internal wall upper section 164 can both be locked in their closed positions separating the first 72 and second 74 lavatories from the counter surface 48. In the open positions the first internal wall upper section 96 and the second internal wall upper section 164 are pivoted outwardly about their pivot connections over the counter surface 48 until the sections are substantially flat against the rear bulkhead wall 78. This provides access to the counter surface 48 from both lavatories 72, 74 and communication between the two lavatories behind the closed partition 162.

Figure 9:
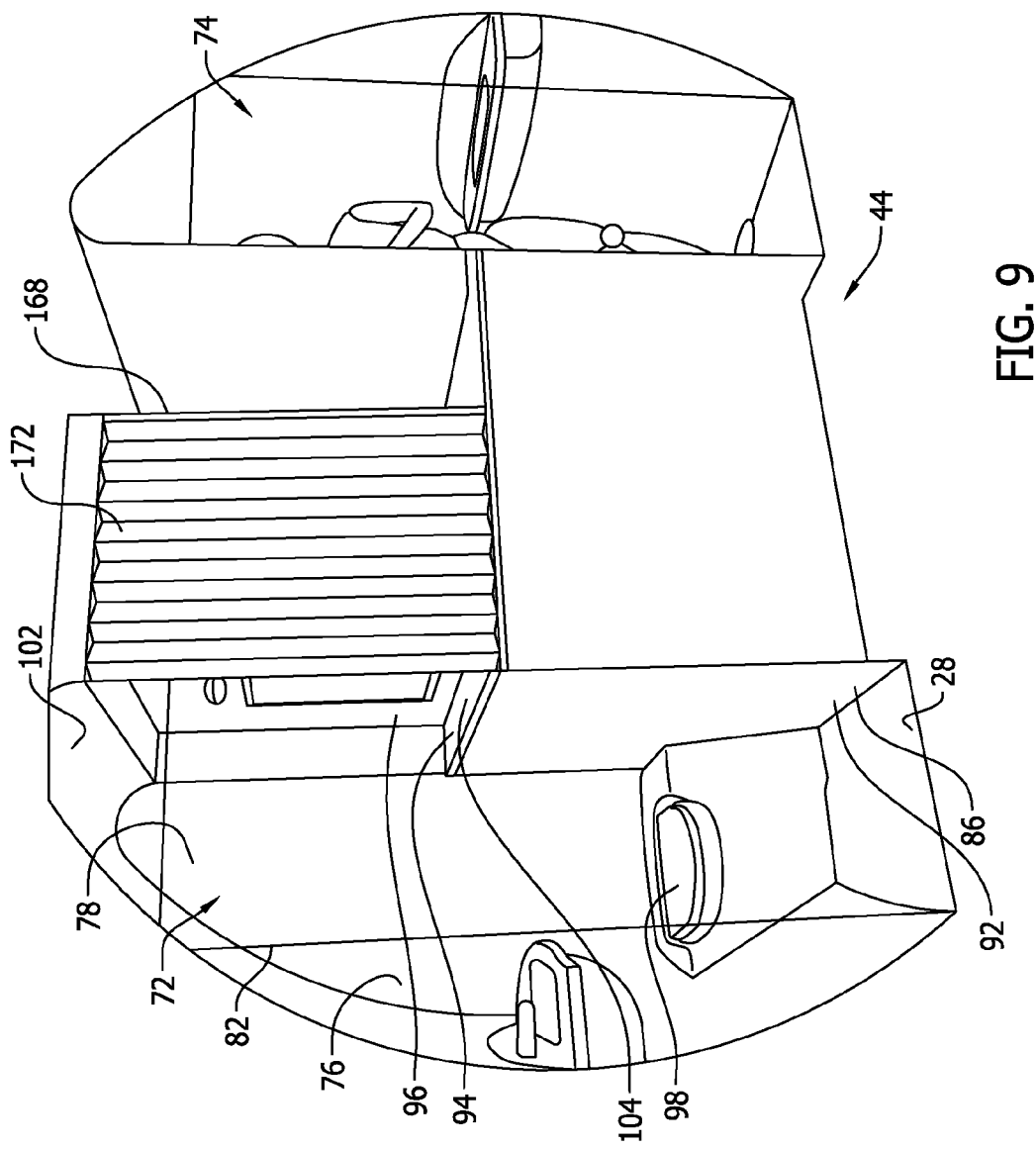

FIG. 9 is a variant embodiment of the lavatories represented in FIG. 8. In the embodiment of FIG. 9 a stationary vertical wall 168 is positioned in the middle of the counter surface 48. The vertical wall 168 extends vertically to the ceiling of the aircraft and longitudinally from the counter surface front edge to the rear edge of the counter surface and the rear bulkhead wall 78. In the FIG. 9 embodiment the partition 172 is partially expandable to the stationary vertical wall 168 and can be locked in its closed position to the vertical wall 168. The internal wall upper section 96 of the first lavatory 72 can be opened and closed in the same manner as that described with reference to FIG. 8. Thus, with the internal wall upper section 96 pivoted open over the counter surface 48 behind the closed partition 172, a large counter surface is provided in the first lavatory 72 that can be used as a changing table or for other purposes.

Figure 10:
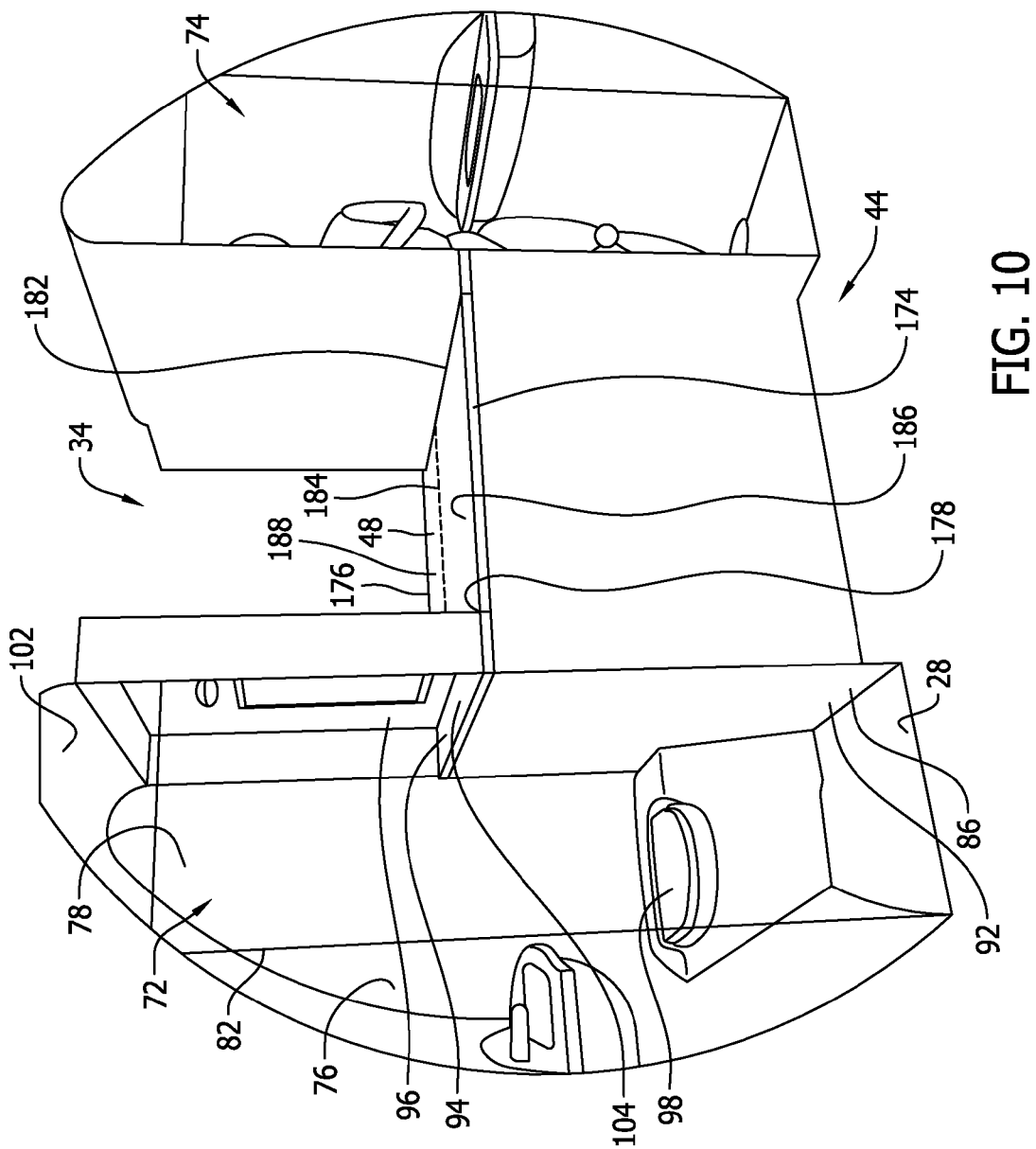

FIG. 10 is a representation of a still further embodiment of the pair of lavatories 72, 74 separated by the galley or stowage space 44. In the embodiment of FIG. 10 the counter surface 48 has a front edge 174 and an opposite rear edge 176, a left side edge 178 and an opposite right side edge 182 as viewed in FIG. 10. Additionally, there is a joint represented by the dashed line 184 between a front portion 186 and a rear portion 188 of the counter surface 48. The joint 184 enables the counter front portion 186 and the counter front edge 174 to be moved rearwardly toward the counter rear portion 188 and the counter rear edge 176. The joint 184 could be a hinge joint, could be a joint that enables the counter front portion 186 to slide into the counter rear portion 188, or some other equivalent type of mechanical joint. This connection between the counter front portion 186 and the counter rear portion 188 enables service carts to be positioned under the counter surface 48 with one service cart in front of a second service cart as represented in FIGS. 3 and 4. Moving the counter surface front portion 186 to its forward position would cover the inline service carts with the counter surface 48. Pushing the counter surface front portion 186 rearward or pivoting the counter surface front portion 186 backward toward the counter surface rear portion 188 will provide access to the second service cart behind the first service cart in the inline arrangement of service carts.

Figure 11:
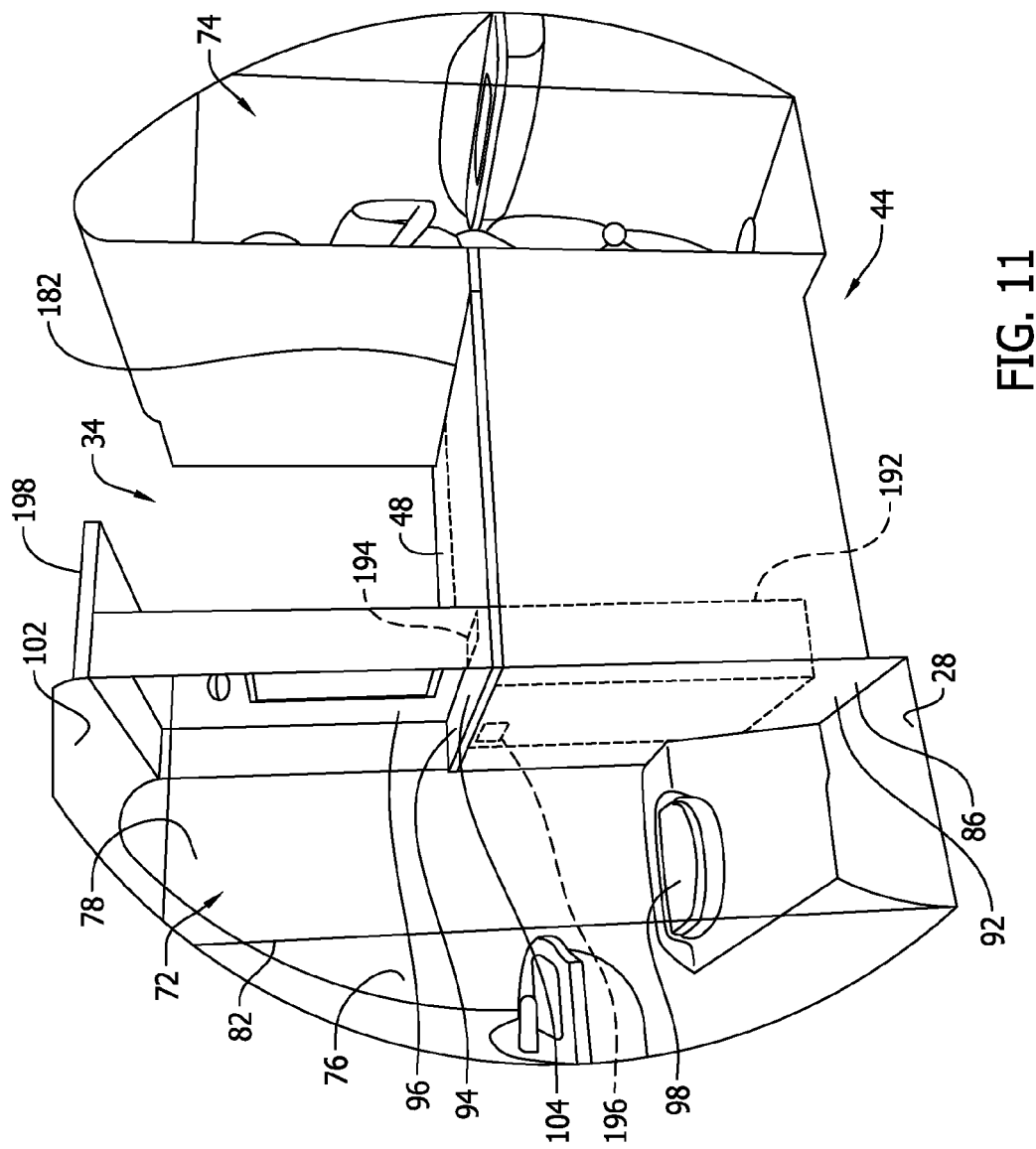

FIG. 11 is a representation of a still further embodiment of the lavatory 72. In FIG. 11 a waste bin 192 is positioned beneath the counter surface 48 and behind a forward, outboard galley cart (not shown). An access opening 194 with a bin flap is provided through the counter surface 48. The access opening 194 is positioned to provide access to the waste bin 192 through the access opening. A second access opening 196 with a bin flap is provided through the internal wall 86. The second access opening 196 also provides access to the waste bin 192 from the interior of the lavatory 72.

Also represented in FIG. 11, in each embodiment of the lavatories with the counter surface between the lavatories, an indirect lighting source 198 is provided above the internal wall upper section 96 and above the counter 48. The indirect lighting source 198 positioned above the internal wall upper section 96 provides light to both the lavatory 72 and the counter surface 48.

As various modifications could be made in the construction of the apparatus and its method of operation herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An aircraft comprising:
an aircraft body containing an aircraft cabin, the aircraft cabin having a longitudinal length between a front of the cabin and a rear of the cabin, and the aircraft cabin having a lateral width between opposite first and second interior side walls of the aircraft body;
a floor surface in the aircraft cabin;
a lavatory in the aircraft cabin;
a stowage space in the aircraft cabin;
a horizontal counter surface above the stowage space, the counter surface having a front edge and an opposite rear edge, a left edge and an opposite right edge;
a first internal wall in the aircraft cabin laterally between the lavatory and the stowage space, the first internal wall having a lower section, an intermediate section and an upper section that are all interconnected, the lower section extending vertically upwardly from the floor surface between a lower area of the lavatory and a lower area of the stowage space to the intermediate section, the intermediate section being a continuation of the counter surface and extending horizontally over the lower area of the stowage space from the lower section to the upper section, and the upper section extending vertically upwardly from the intermediate section between an upper area of the lavatory and an upper area of the stowage space, wherein a lateral width dimension of the lavatory above the intermediate section is larger than a largest lateral width dimension of the lavatory below the intermediate section;
a second internal wall in the aircraft cabin, the second internal wall having a second internal wall upper section that extends upwardly from the counter surface and is spaced laterally from the first internal wall upper section; and,
a vertical partition attached to the first internal wall upper section, the partition being moveable between an open position and a closed position where in the open position the partition extends laterally over the counter surface between the first internal wall upper section and the second internal wall upper section and in the closed position the partition is displaced from over the counter surface; and,
the first internal wall upper section being moveable between an opened position and a closed position where in the closed position of the first internal wall upper section the first internal wall upper section extends between the first internal wall intermediate section and the counter surface separating the lavatory from the counter surface and in the open position of the first internal wall upper section the first internal wall upper section extends over the counter surface providing access from the lavatory to the counter surface.

2. The aircraft of claim 1, further comprising:
a folding shelf on the first internal wall, the folding shelf being moveable between a horizontal position and a vertical position of the folding shelf.

3. The aircraft of claim 1, further comprising:
a grab handle on the first internal wall.

4. The aircraft of claim 1, further comprising:
a light source extending laterally over the first internal wall upper section providing light to the lavatory and to the counter surface.

5. The aircraft of claim 1, further comprising:
an outboard window in the lavatory.

6. The aircraft of claim 1, further comprising:
the first internal wall upper section being spaced a larger distance laterally from the first interior sidewall of the aircraft body than a distance that the second internal wall upper section is spaced laterally from the second interior side wall of the aircraft body.

7. The aircraft of claim 1, further comprising:
a longitudinal length of the first internal wall upper section is larger than a longitudinal length of the first internal wall lower section.

8. The aircraft of claim 1, further comprising:
a waste bin under the counter surface;
a first access opening in the counter surface providing access to the waste bin; and,
a second access opening in the first internal wall providing access to the waste bin.

9. The aircraft of claim 1, further comprising:
the first internal wall upper section having left and right edges; and,
an intermediate portion of the first internal wall upper section between the left and right edges extends away from the lavatory and toward the counter surface.

10. An aircraft comprising:
an aircraft body containing an aircraft cabin, the aircraft cabin having a longitudinal length between a front of the cabin and a rear of the cabin, and the aircraft cabin having a lateral width between opposite first and second interior side walls of the aircraft body;
a floor surface in the aircraft cabin;
a lavatory in the aircraft cabin;
a stowage space in the aircraft cabin;
an internal wall in the aircraft cabin laterally between the lavatory and the stowage space, the internal wall having a lower section, and intermediate section and an upper section that are all interconnected, the lower section extending vertically upwardly from the floor surface between a lower area of the lavatory and a lower area of the stowage space to the intermediate section, the intermediate section extending horizontally over the lower area of the stowage space from the lower section to the upper section, and the upper section extending vertically upwardly from the intermediate section between an upper area of the lavatory and an upper area of the stowage space, wherein a lateral width dimension of the lavatory above the intermediate section is larger than a largest lateral width dimension of the lavatory below the intermediate section; and,
a lavatory floor surface inside the lavatory, the lavatory floor surface having a front edge at the floor surface of the aircraft cabin and a longitudinally opposite rear edge, the lavatory floor surface sloping downward from horizontal as the lavatory floor surface extends aft from the front edge to the rear edge.

11. The aircraft of claim 10, further comprising:
a folding shelf on the internal wall, the folding shelf being moveable between a horizontal position and a vertical position of the folding shelf.

12. The aircraft of claim 10, further comprising:
a grab handle on the internal wall.

13. The aircraft of claim 10, further comprising:
a light source extending laterally over the internal wall upper section providing light to the lavatory and to the stowage space.

14. The aircraft of claim 10, further comprising:
an outboard window in the lavatory.

15. The aircraft of claim 10, further comprising:
the internal wall upper section having opposite left and right side edges; and,
an intermediate portion of the internal wall upper section extends away from the lavatory as the internal wall upper section extends from the opposite left and right side edges toward the intermediate portion of the internal wall upper section.

16. An aircraft comprising:
an aircraft body containing an aircraft cabin, the aircraft cabin having a longitudinal length between a front of the cabin and a rear of the cabin, the aircraft cabin having a lateral width between opposite first and second interior side walls of the aircraft body;
a floor surface in the aircraft cabin;
a lavatory in the aircraft cabin;
a stowage space in the aircraft cabin;
a plurality of service carts in the aircraft cabin with at least a first service cart and a second service cart being relatively positioned where the second service cart is longitudinally behind the first service cart;
a horizontal counter surface above the stowage space and the plurality of service carts, the counter surface having a front edge and an opposite rear edge, a left edge and an opposite right edge, the counter surface front edge being moveable toward the rear edge to expose the first and second service carts beneath the counter surface;
a first internal wall in the aircraft cabin laterally between the lavatory and the stowage space, the first internal wall having a lower section, an intermediate section and an upper section that are all interconnected, the lower section extending vertically upwardly from the floor surface between a lower area of the lavatory and a lower area of the stowage space to the intermediate section, the intermediate section extending horizontally over the lower area of the stowage space from the lower section to the upper section, and the upper section extending vertically upwardly from the intermediate section between an upper area of the lavatory and an upper area of the stowage space.

17. The aircraft of claim 16, further comprising:
a folding shelf on the internal wall, the folding shelf being moveable between the horizontal position and a vertical position of the folding shelf.

18. The aircraft of claim 16, further comprising:
an outboard window in the lavatory.

19. The aircraft of claim 16, further comprising:
a toilet in the lavatory, the toilet having a toilet seat; and,
the internal wall intermediate section being substantially planar with the toilet seat.

20. The aircraft of claim 16, further comprising:
a waste bin under the counter surface;
a first access opening in the counter surface providing access to the waste bin; and,
a second access opening in the first internal wall providing access to the waste bin.

21. An aircraft comprising:
an aircraft body containing an aircraft cabin, the aircraft cabin having a longitudinal length between a front of the cabin and a rear of the cabin, and the aircraft cabin having a lateral width between opposite first and second interior side walls of the aircraft body;
a floor surface in the aircraft cabin;
a lavatory in the aircraft cabin;
a stowage space in the aircraft cabin;
an internal wall in the aircraft cabin laterally between the lavatory and the stowage space, the internal wall having a lower section, an intermediate section and an upper section that are all interconnected, the lower section extending vertically upwardly from the floor surface between a lower area of the lavatory and a lower area of the stowage space to the intermediate section, the intermediate section extending horizontally over the lower area of the stowage space from the lower section to the upper section, and the upper section extending vertically upwardly from the intermediate section between an upper area of the lavatory and an upper area of the stowage space;
the internal wall upper section having opposite left and right side edges; and,
an intermediate portion of the internal wall upper section extends away from the lavatory as the internal wall upper section extends from the opposite left and right side edges toward the intermediate portion of the internal wall upper section.

22. The aircraft of claim 21, further comprising:
a folding shelf on the internal wall, the folding shelf being moveable between a horizontal position and a vertical position of the folding shelf.

23. The aircraft of claim 21, further comprising:
a grab handle on the internal wall.

24. The aircraft of claim 21, further comprising:
an outboard window in the lavatory.

25. An aircraft comprising:
an aircraft body containing an aircraft cabin, the aircraft cabin having a longitudinal length between a front of the cabin and a rear of the cabin, and the aircraft cabin having a lateral width between opposite first and second interior side walls of the aircraft body;
a floor surface in the aircraft cabin;
a lavatory in the aircraft cabin;
a stowage space in the aircraft cabin;
an internal wall in the aircraft cabin laterally between the lavatory and the stowage space, the internal wall having a lower section, an intermediate section and an upper section that are all interconnected, the lower section extending vertically upwardly from the floor surface between a lower area of the lavatory and a lower area of the stowage space to the intermediate section, the intermediate section extending horizontally over the lower area of the stowage space from the lower section to the upper section, and the upper section extending vertically upwardly from the intermediate section between an upper area of the lavatory and an upper area of the stowage space; and,
an outboard window in the lavatory.

26. The aircraft of claim 25, further comprising:
a folding shelf on the internal wall, the folding shelf being moveable between a horizontal position and a vertical position of the folding shelf.

27. The aircraft of claim 25, further comprising:
a grab handle on the internal wall.

28. The aircraft of claim 25, further comprising:
a light source extending laterally over the internal wall upper section providing light to the lavatory and to the stowage space.

* * * * *